US011285672B2

(12) United States Patent
Cooper (10) Patent No.: US 11,285,672 B2
(45) Date of Patent: Mar. 29, 2022

(54) THREE-DIMENSIONAL PRINTER RESPONSIVE TO EXTERNAL VIBRATIONS (71) Applicant: 3D Systems, Inc., Rock Hill, SC (US)

(72) Inventor: Guthrie Cooper, Mill Spring, NC (US)

(73) Assignee: 3D Systems, Inc., Rock Hill, SC (US)

( * ) Notice: Subject to any disclaimer, the term of this patent is extended or adjusted under 35 U.S.C. 154(b) by 302 days.

(21) Appl. No.: 16/455,082

(22) Filed: Jun. 27, 2019

(65) Prior Publication Data

US 2020/0001539 A1 Jan. 2, 2020

Related U.S. Application Data (60) Provisional application No. 62/691,104, filed on Jun. 28, 2018.

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/135* (2017.08); *B29C 64/245* (2017.08); *B29C 64/255* (2017.08); *B29C 64/264* (2017.08); *B33Y 10/00* (2014.12); *B33Y 30/00* (2014.12); *B33Y 50/02* (2014.12); *G02B 26/101* (2013.01)

(58) Field of Classification Search
CPC ....... B29C 64/393; B29C 64/10; B29C 64/20; B29C 64/264; B29C 64/245; B29C 64/255; B29C 64/135; B33Y 10/00; B33Y 30/00; B33Y 50/02; G02B 26/101
See application file for complete search history.

(56) References Cited

U.S. PATENT DOCUMENTS

2017/0045877 A1* 2/2017 Shapiro ................. B23K 26/38
2017/0090462 A1 3/2017 Vivek et al.
(Continued)

FOREIGN PATENT DOCUMENTS

| CN | 205498075 | 8/2016 |
|---|---|---|
| EP | 2292413 | 3/2011 |
| JP | 2017087595 | 5/2017 |

OTHER PUBLICATIONS

PCT International Search Report the International Searching Authority for PCT/US2019/039550, dated Oct. 15, 2019 (6 pages).
(Continued)

*Primary Examiner* — Nahida Sultana (57) ABSTRACT

A three-dimensional printing system for manufacturing a three-dimensional article includes a build platform, a light engine, a sensor, and a controller. The build platform is for supporting the three-dimensional article. The light engine is for addressing the build plane for selectively solidifying the material layer onto an active surface. The sensor is mounted on the light engine and is configured to generate a signal based upon vibrations from an external source. The controller is configured to form layers of the three dimensional article. Concurrent with forming the layers, the controller is configured to receive a signal from the sensor, analyze the signal to compare received vibrations to a predetermined vibration threshold, and, if the received vibrations exceed the predetermined threshold, take further action.

18 Claims, 9 Drawing Sheets

(51) Int. Cl.
   *B33Y 30/00*    (2015.01)
   *B33Y 50/02*    (2015.01)
   *B29C 64/264*   (2017.01)
   *B29C 64/245*   (2017.01)
   *B29C 64/255*   (2017.01)
   *B29C 64/135*   (2017.01)
   *G02B 26/10*    (2006.01)

(56)          References Cited

U.S. PATENT DOCUMENTS

2018/0150058 A1     5/2018   Sharpiro
2018/0326712 A1*   11/2018   Raghavan .............. B33Y 50/02
2021/0237360 A1*    8/2021   Champion .............. B22F 12/67
2021/0316508 A1*   10/2021   Mann, Jr .............. B29C 64/371

OTHER PUBLICATIONS

PCT Written Opinion of the International Searching Authority for PCT/US2019/039550, dated Oct. 15, 2019 (7 pages).
English machine translation of Japanese Publication No. JP 2017087595 from https://www.j-platpat.inpit.go.jp/p0000.

* cited by examiner

SCANNING SYSTEM BLOCK DIAGRAM

FIG. 10

THREE-DIMENSIONAL PRINTER RESPONSIVE TO EXTERNAL VIBRATIONS

CROSS-REFERENCE TO RELATED APPLICATIONS

This non-provisional patent application claims priority to U.S. Provisional Application Ser. No. 62/691,104, Entitled "THREE-DIMENSIONAL PRINTER RESPONSIVE TO EXTERNAL VIBRATIONS" by Guthrie Cooper, filed on Jun. 28, 2018, incorporated herein by reference under the benefit of U.S.C. 119(e).

FIELD OF THE INVENTION

The present disclosure concerns an apparatus and method for the digital fabrication of three-dimensional articles of manufacture by a layer-by-layer solidification of a build material. More particularly, the present disclosure concerns a way of monitoring and mitigating an effect of external vibrations upon the operation of a three-dimensional printer.

BACKGROUND

Three-dimensional printers are in wide use for manufacturing three-dimensional articles. There is an increasing desire to form highly precision articles in which dimensional accuracy is very important. Applications can include certain medical implants, aircraft parts, machine parts, and other articles for which precise dimensional accuracy or smooth surfaces are very important to a proper function. One challenge is an impact of external vibrations during the three-dimensional printing process. There is a need to verify process integrity even when such vibrations occur.

SUMMARY

In a first aspect of the disclosure, a three-dimensional printing system for manufacturing a three-dimensional article includes a build platform, a light engine, a sensor, and a controller. The build platform is for supporting the three-dimensional article. The build platform or the three-dimensional article define an active surface for accreting a material layer. The light engine is for addressing the build plane for selectively solidifying the material layer onto the active surface. The sensor is mounted on the light engine and is configured to generate a signal based upon vibrations that originate from a source external to the light engine. The controller is configured to form layers of the three dimensional article including positioning the active surface at the build plane, operate the light engine to selectively cure portions of resin at the build plane, and repeat positioning and operating to complete the three-dimensional article. Concurrent with forming the layers, the controller is configured to receive a signal from the sensor, analyze the signal to compare received vibrations to a predetermined vibration threshold, and, if the received vibrations exceed the predetermined threshold, take further action.

In one implementation the three-dimensional printing system includes a resin vessel containing resin. During formation of a layer the active surface is positioned proximate to a top surface of resin. The light engine emits light downwardly to the build plane. The light engine can include a laser module and a scan module.

In another implementation the three-dimensional printing system includes a resin vessel containing resin. The resin vessel includes a transparent sheet that forms a lower surface of the resin vessel. The build plane and active surface are above and proximate to the transparent sheet. The light engine emits light upwardly and through the transparent sheet and to the build plane. The light engine can include a light source and a spatial light modulator.

In yet another implementation the light engine includes a base housing and a cantilevered support that extends from a proximal end at the base to a distal end. The sensor is mounted to the distal end of the cantilevered support to be more sensitive to external sources of vibrations. The sensor can be one or more of an optical sensor and an accelerometer.

In a further implementation the vibration threshold can be based on one or more of a peak vibration amplitude, a time duration of vibration above a threshold, and an integration of vibration energy for a period of time.

In a yet further implementation the further action includes halting forming layers. The controller can be further configured to restart forming layers when the received vibration no longer exceeds a minimum vibration threshold.

In another implementation the further action includes storing information related to the received vibration. The information can include one or more of a timestamp, a formed layer identifier, a position within the three-dimensional object, and a vibration parameter. The vibration parameter can be one or more of a peak vibration amplitude, a time duration of vibration above a threshold, and an integration of vibration energy for a period of time.

In a second aspect of the disclosure, a three-dimensional printing system for manufacturing a three-dimensional article includes a laser module, a base housing, a cantilevered support, a scan module, a distal sensor, and a controller. The laser module is configured to emit a light beam along a main optical path from the laser module to a build plane. The cantilevered support extends from a proximal end at the base housing to a distal end. The scan module is mounted to the base housing at the proximal end of the cantilevered support. The scan module is configured to receive the light beam and to scan the light beam along two axes to address the build plane. The distal sensor is mounted to the distal end of the cantilevered support. The controller is configured to operate the laser module to emit light along the main optical path, operate the scan module to scan the beam over the build plane, receive a signal from the distal sensor, and analyze the signal to determine whether vibrations originating external to the three-dimensional printing system have exceeded a predetermined vibration threshold.

DETAILED DESCRIPTION OF THE PREFERRED EMBODIMENTS

Figure 1:
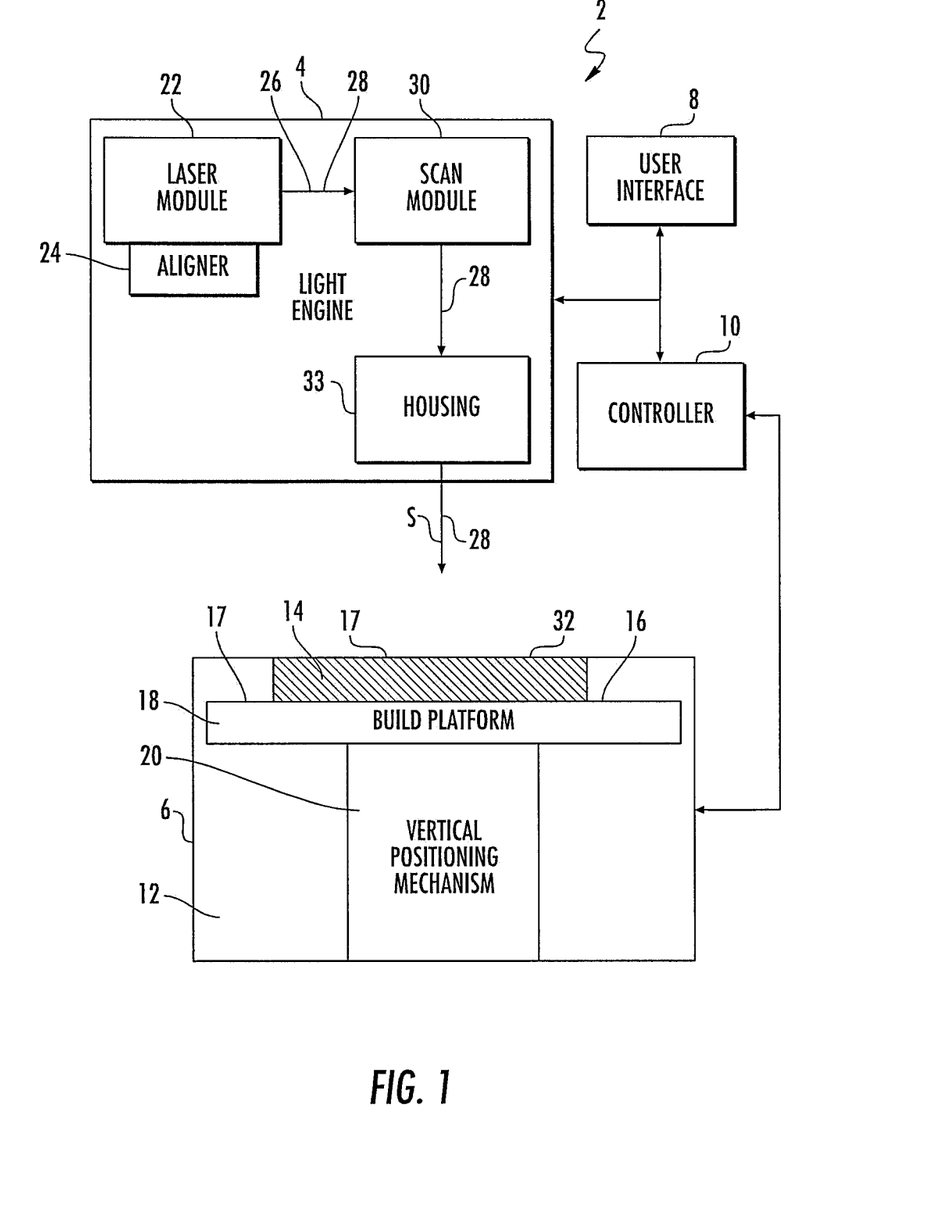
FIG. 1 is a block diagram schematic of an embodiment of a three-dimensional printing system incorporating various calibration techniques.

FIG. 1 is a block diagram schematic of an embodiment of a three-dimensional printing system 2 incorporating various calibration techniques. Three-dimensional printing system includes a light engine 4, a resin vessel 6, and a user interface 8 all coupled to a controller 10.

The resin vessel 6 contains photocurable resin 12 for forming a three-dimensional article 14 upon a top surface 16 of a build platform 18. The build platform 16 is vertically positioned in the resin 12 by a vertical positioning mechanism 20.

The light engine 4 includes a laser module 22 coupled to an aligner 24. Aligner 24 provides mechanical support, positioning, and alignment for laser module 22. The laser module 22 emits a light beam 26 that travels along a main optical path 28. The main optical path 28 is defined by laser module 22 and scan module 30. The main optical path 28 ends at a build plane 32 which is proximate to a top surface of the three-dimensional article 14.

The scan module 30 scans the light beam 26 along two substantially perpendicular lateral directions (X and Y) to define the build plane 32. The scan directions are substantially perpendicular to a propagation direction S of the light beam 26. The scan module is mounted to a base housing 33. The base housing 33 defines an opening 34 (FIG. 2) that allows the light beam to pass out of the light engine 4 and to the resin vessel 6. Along the main optical path 28 between the laser module 22 and the build plane 32 the light beam 28 converges from an initial diameter to a final diameter at the build plane 32. In one embodiment, the build plane 32 is at a point of focus for the light beam 28. However, the laser module 22 can include optics to controllably vary a diameter of the light beam 28 at the build plane 32.

The three-dimensional article 14 is manufactured with a layer by layer process under control of controller 10: (1) The vertical positioning mechanism 20 is operated to position an active surface 17 (initially the top surface 16 of the build platform 18) at build plane 32. (2) A layer of uncured resin 12 is provided over the active surface 17. (3) The laser module 22 and scan module 30 are operated to selectively cure a layer of the three-dimensional article 14 onto the active surface 17. (4) Steps (1)-(3) are repeated to complete manufacture of the three-dimensional article 14. Thus, the material layers of cured resin are accreted onto the active surface 17 in a layer-by-layer manner.

The user interface 8 can be used by the user to input commands and to receive information from the controller 10. In one embodiment the user interface 8 is integrated into a chassis of the three-dimensional printing system 2. In other embodiments, the user interface 8 is part of a physically separated computer that can include one or more of a smartphone, a laptop computer, a desktop computer, a tablet computer, or any other device. The user interface 8 can communicate with the controller 10 using a wireless or wired connection.

The commands input into the user interface 8 can be for calibration or manufacture of the three-dimensional article 14. The information can include a status, error, or calibration information and can occur during formation of a three-dimensional article 14 or during a calibration routine. The information can be displayed on the user interface 8 and/or stored in a form that can be used later such as in records of a database or spreadsheet.

In an alternative embodiment, the resin vessel includes a transparent sheet defining a lower surface. The build platform supports a lower facing surface of the three-dimensional article in facing relation with the transparent sheet. The build plane is defined proximate to a lower face of the three dimensional article. The light engine is configured to emit light upwardly through the transparent sheet and to the build plane to accretively form layers onto the lower face. The light engine can include a light source and a spatial light modulator.

Figure 2:
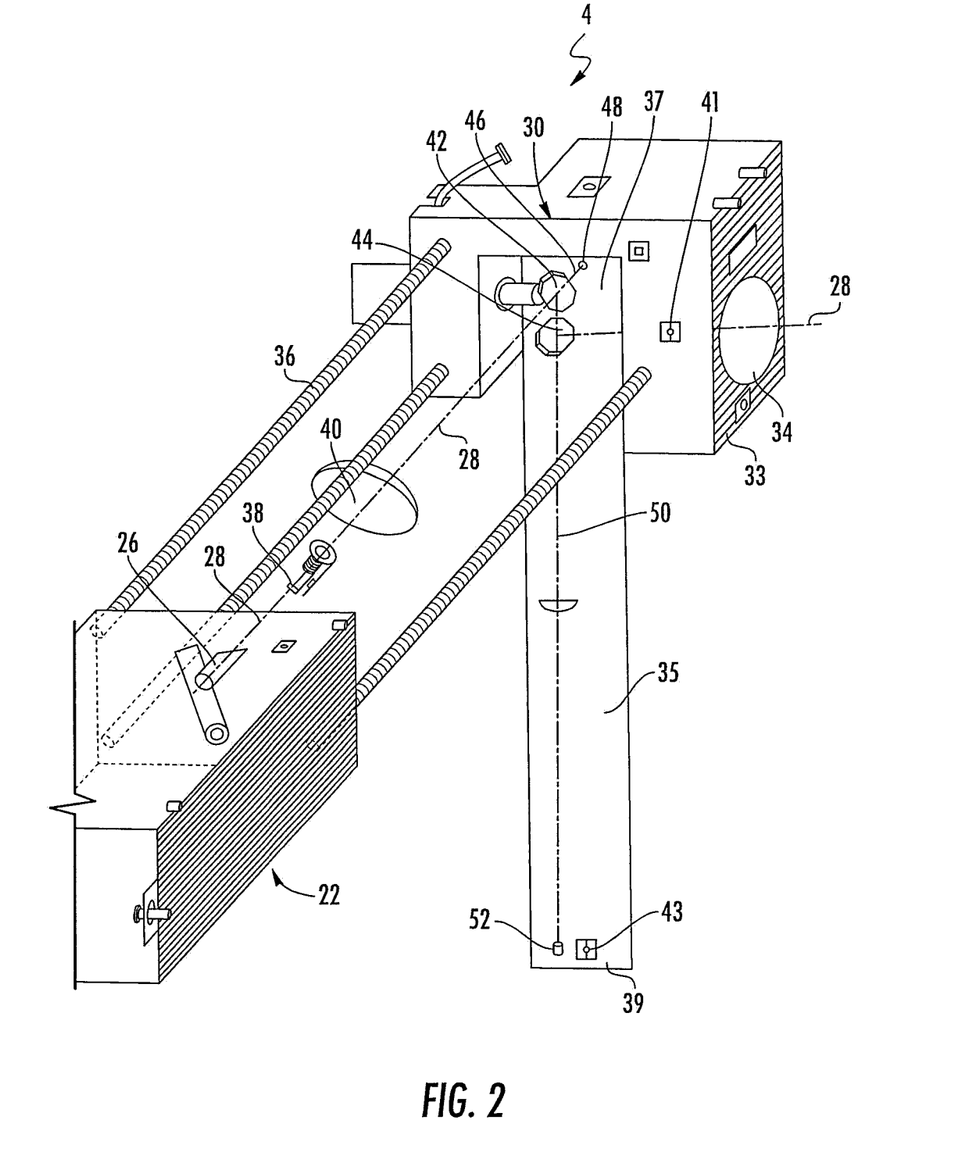
FIG. 2 is an isometric illustration of an embodiment of a light engine.

FIG. 2 is an isometric illustration of an embodiment of the light engine 4. The laser module 22 is coupled to the scan module 30 with precision rods 36. Between the laser module 22 and the scan module 30 is a small diameter concave lens 38 and a large diameter convex lens 40.

The scan module 30 includes a motorized X-mirror 42 and a motorized Y-mirror 44. The X-mirror scans the light beam 26 along an X-axis and the Y-mirror scans the light beam 26 along a Y-axis to address the build plane 32. The main optical path 28 extends from the laser module 22, through lenses 38 and 40, to the X-mirror 42, to the Y-mirror 44, through the opening 34, and to the build plane 32 (FIG. 1). Between the laser module 22 and the build plane 32, the light beam 26 converges along the optical path 28. Stated another way, a diameter of the light beam 26 decreases along the optical path 28 toward the build plane 32. In one embodiment, the light beam has a focal point and minimum beam diameter at the build plane 32. However, the controller 10 can move the lens 38 to control a diameter and degree of focus of the beam at the build plane 32.

For purposes of calibration there are at least two secondary optical paths. The main optical path 28 reflects from X-mirror 42 and from Y-mirror 44. A secondary optical path 46 extends through the X-mirror 42 to an X-sensor 48. Another secondary optical path 50 extends through the Y-mirror and to a Y-sensor 52. The secondary optical paths 46 and 50 will be described in more detail infra.

The scan module 30 is mounted to base housing 33. Also mounted to the base housing 33 is a cantilevered support 35 that extends from a proximal end 37 to a distal end 39. The scan module 30 is mounted at the proximal end 37. The secondary optical path 50 is defined along the cantilevered support between the Y-mirror 44 and the Y-sensor 52. A sensor 41 is mounted at the proximal end 37 to receive internal (internal meaning originating from within the printing system 2) vibrations generated by the scan module 30. The sensor 41 provides a signal to the controller 10 that is indicative of the internal vibrations. Sensor 41 can be a multi-axis accelerometer. A sensor 43 is mounted at the distal end 39 so as to be sensitive to vibrations originating from sources that are external to the three-dimensional printing system 2. The sensor 43 provides a signal to the controller 10 that is indicative of the vibrations at sensor 43. Sensor 43 can be a multi-axis accelerometer. In one implementation, the controller 10 can utilize a signal from sensor 52 to analyze vibrations from external sources and so there may be no need for sensor 43. In another implementation, the controller 10 utilizes signals from both sensors 43 and 52 to analyze the external vibrations.

Figure 3:
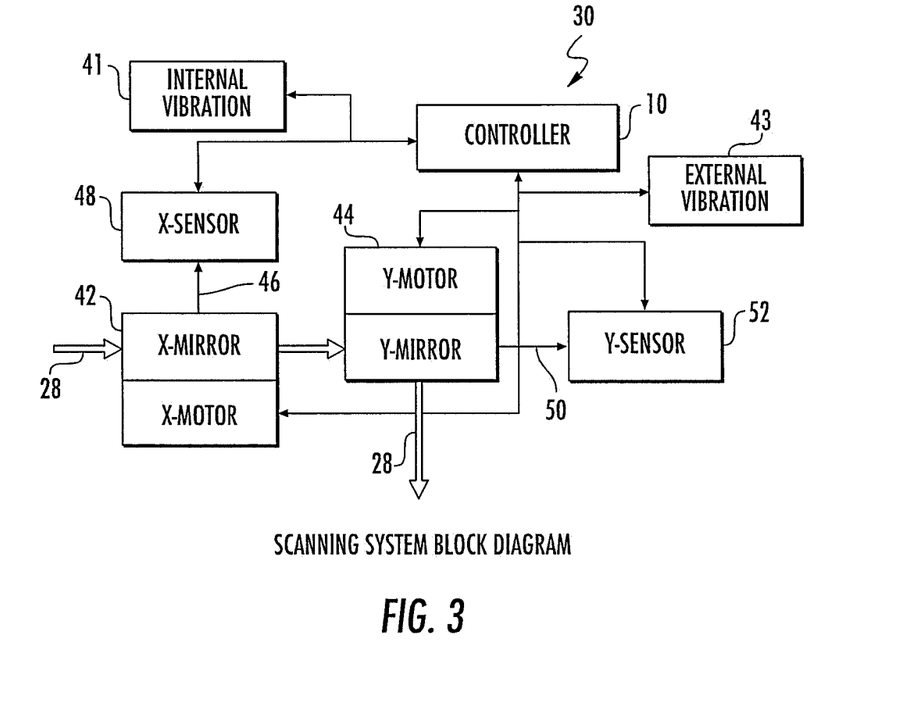
FIG. 3 is an electrical block diagram illustrating a scanning system for scanning a light beam over a build plane.

FIG. 3 is an electrical block diagram including the scanning system 30 illustrating the controller 10 coupled to the motorized X-mirror 42, X-sensor 48, the motorized Y-mirror 44, and the Y-sensor 52. Also illustrated is the primary optical path 28 and the secondary optical paths 46 and 50. Sensor 41 that senses internal vibrations is shown coupled to controller 10. Sensor 43 that senses external vibrations is also shown coupled to controller 10.

Figure 4:
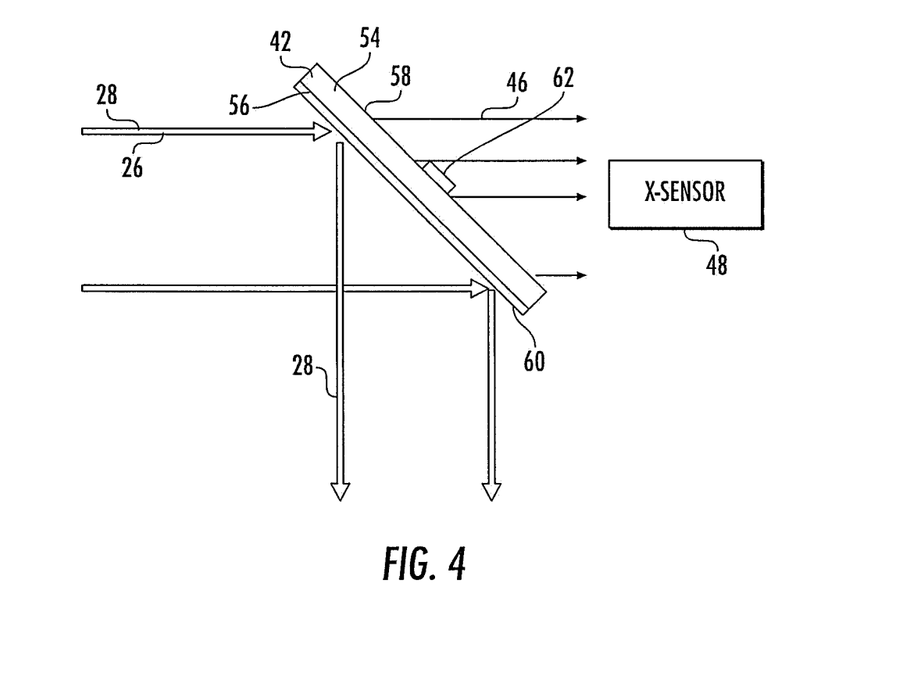
FIG. 4 is a schematic diagram illustrating a portion of a scanning system including an X-mirror and an X-sensor.

FIG. 4 is a schematic diagram illustrating a portion of the scan module 30 including the X-mirror 42 and the X-sensor 48. The X-mirror has a substrate 54 having a front side 56 and a back side 58. The front side 56 has an optical coating 60. The back side 58 has an opaque feature 62.

The optical coating 60 reflects at least 90% of the optical power of the light beam 26 along the main optical path 28. The X-mirror 42 transmits no more than 10% of the optical power of the light beam 26 along the secondary optical path 46. In a more particular embodiment, the X-mirror 42 transmits between 0.1% and 4% of the optical power of the light beam 26 along the secondary optical path 46. In a yet more particular embodiment, the X-mirror 42 transmits between 0.2% and 2% of the optical power of the light beam 26 along the secondary optical path 46. In a further embodiment, the X-mirror 42 transmits about 1% of the optical power of the light beam 26 along the secondary optical path 46.

In the illustrated embodiment the opaque feature 62 is a small dot of reflective material that is centrally located relative to the transmitted optical path 46. The result is that the X-sensor receives a lowered intensity light beam with a shadow from the opaque feature 62. The location of the shadow with respect to the transmitted light beam along path 46 is indicative of an alignment of the light beam relative to the scanning system 30.

Figure 5:
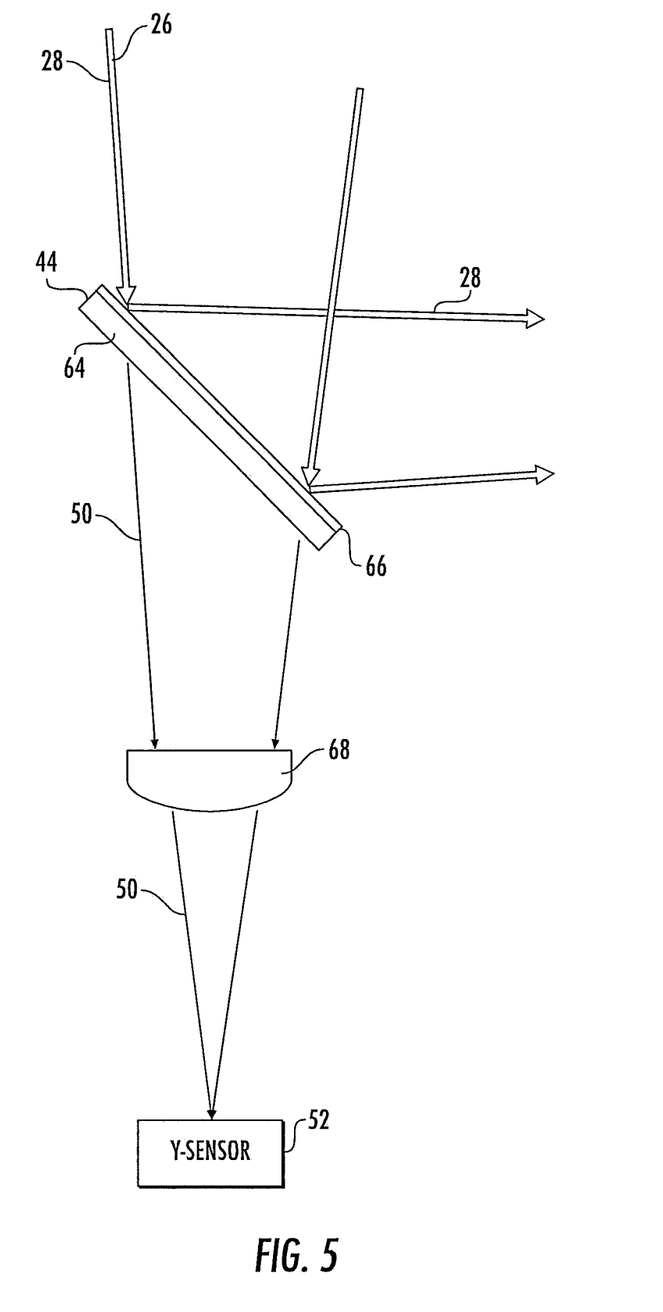
FIG. 5 is a schematic diagram illustrating a portion of a scanning system including a Y-mirror and a Y-sensor.

FIG. 5 is a schematic diagram illustrating a portion of the scanning system 30 including the Y-mirror 44 and the Y-sensor 52. The Y-mirror 44 has a substrate 64 an optical coating 66. The optical coating reflects at least 90% of the optical power of the light beam 26 along the main optical path 28. The Y-mirror transmits no more than 10% of the optical power of the light beam 26 along the secondary optical path 50. In a more particular embodiment, the Y-mirror 44 transmits between 0.1% and 4% of the optical power of the light beam 26 along the secondary optical path 50. In a yet more particular embodiment, the Y-mirror 50 transmits between 0.2% and 2% of the optical power of the light beam 26 along the secondary optical path 50. In a further embodiment, the Y-mirror 50 transmits about 1% of the optical power of the light beam 26 along the secondary optical path 50.

From the Y-mirror 44, both the reflected and transmitted portions of the light beam 26 converge. In the illustrated embodiment, the diameter of the beam at the Y-sensor is the same as the diameter at the build plane 32. The converging lens 68 is included in order to shorten the physical path length between the Y-mirror and the Y-sensor 52. In a particular embodiment, the light beam has a focused minimum diameter at the build plane 32 and the Y-sensor 52. An alternative embodiment does not include converging lens 68. Then the physical optical path length between the Y-mirror and the build plane 32 is the same as the physical optical path length between the Y-mirror and the Y-sensor 52.

The Y-sensor 52 is a camera or other sensor that captures a profile of the transmitted portion of beam 26. Because the beam diameter at sensor 52 is the same as at the build plane 32, the resultant profile is a good indicator of how well focused the beam 26 is upon build plane 32. The controller 10 is configured to analyze the profile and to determine a degree of the focus of laser module 22 upon the build plane 32.

Figure 6:
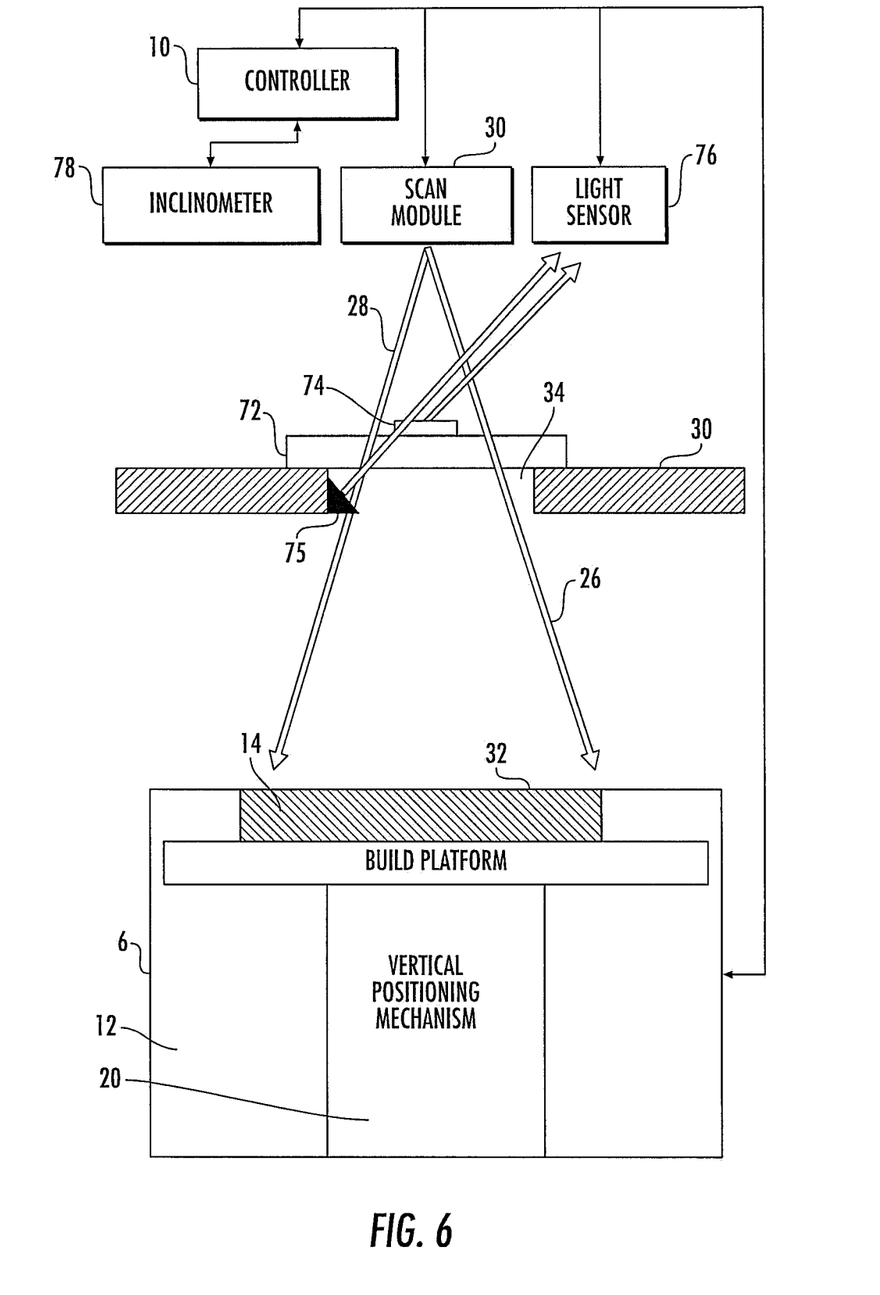
FIG. 6 is a schematic block diagram of a portion of a three-dimensional printing system.

FIG. 6 is a schematic diagram of a portion of the three-dimensional printing system 2 for illustrating a last portion of the main optical path 28 from the scan module 30 to the build plane 32. During the manufacture of the three-dimensional article 14, fumes are generated. The scan module 30 is protected from the fumes by the base housing 33. The base housing 33 includes opening 34 for allowing the scanning beam 26 to fully address the build plane 32. In some embodiments, the opening 34 is a precision opening.

The opening 34 is closed by a transparent plate 72. The transparent plate 72 provides two functions. First, it protects the scan module 30 from the fumes. Second, it provides calibration features for aligning the optical path 28 to the build plane 32. The transparent plate 72 includes a reflective feature 74. As the light beam 26 is scanned across build plane 32, it sometimes impinges on the reflective feature 74. Light is then reflected from reflective feature 74 up into light sensor 76.

In an illustrative embodiment, the reflective feature 74 includes an array of small dots or lines of reflective material with known locations corresponding to the build plane 32. As the light beam 26 impinges upon these small dots 74 the controller 10 receives signals indicative of reflected light received by sensor 76. The controller 10 uses this information to correlate operating of the scan module 30 with build plane coordinates. In some embodiments, sensor 76 is an arrangement or array of sensors 76 for capturing light reflected from different dots. Also, sensor 76 can represent different sensors optimized for different kinds of measurement. One kind of measurement can be based upon presence and/or trajectory of a light beam. Another kind of measurement can be based upon a power level.

The small dots 74 are much smaller than a diameter of the converging light beam 26 as it impinges upon the transparent plate 72. In one embodiment, the light beam diameter (at impingement) is at least ten times an axial dimension of a small dot 74. In other embodiments, the light beam diameter at least 100 times or at least 1000 times the diameter of the small dot 74. The small dots 74 therefore have no significant effect on the light beam 26 insofar as properly solidifying the resin 12 at build plane 32.

In the illustrated embodiment, reflective feature 74 is disposed on an upper surface of the transparent plate 72. In an alternative embodiment, the reflective feature 74 can be disposed upon a lower surface of the transparent plate 72. In some embodiments, the signal from sensor 76 can be utilized to analyze a power output of the laser module 22. Having a reflective feature 74 disposed upon the lower surface of the transparent plate 72 would allow a power level to include attenuation through the transparent plate.

In the illustrated embodiment, an added reflective feature 75 is mounted below the transparent plate 72. This reflective feature 75 has an added benefit. As three-dimensional articles 14 are fabricated, a film of resin can build up on the lower surface of the transparent plate 72. This will attenuate light from the scan module 30. During operation, sensor 76 can monitor an intensity of radiation reflected by reflective feature 75. Controller 10 can receive a signal from sensor 76 and analyze that signal to determine a reduction in power level of beams 26 reaching the build plane 32. Then the controller 10 can increase an energy dosage in compensation and/or send a message to user interface 8 instructing a user to clean the transparent plate 72.

Also included is an inclinometer 78 that provides a signal to the controller 10 that is indicative of the orientation of the scan module 30 with respect to a gravitational reference. In one embodiment, the controller 10 is configured to provide instructions to a user for leveling portions of the three-dimensional printing system 2 in the event that a certain threshold is determined. In another embodiment, the controller 10 is configured to compensate for an angular tilt.

Figure 7:
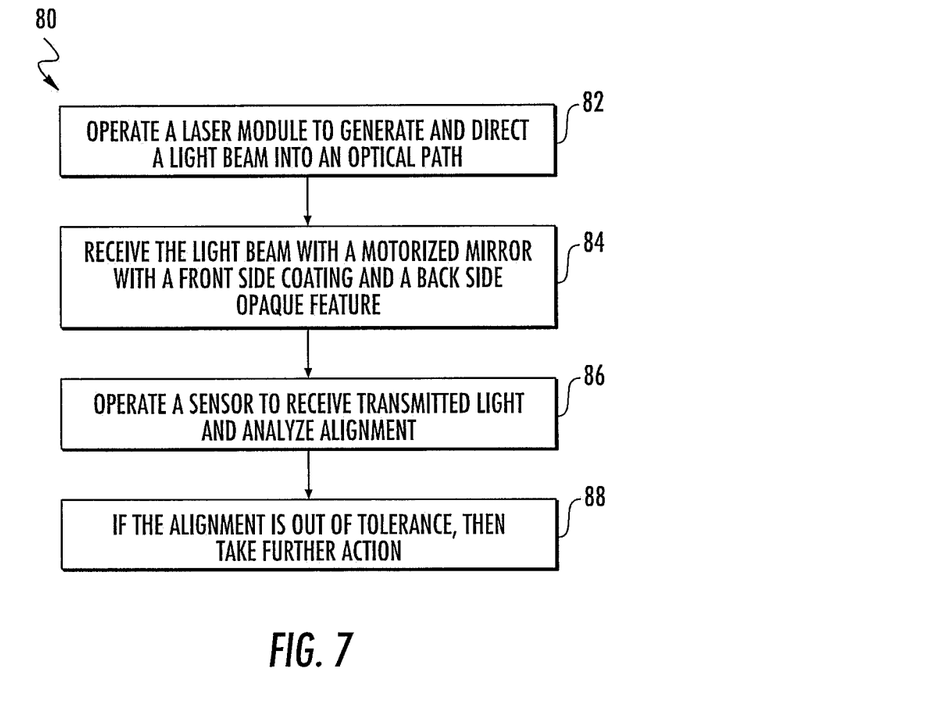
FIG. 7 is a flowchart depicting an embodiment of a method for aligning a light beam to a main optical path.
Figure 8:
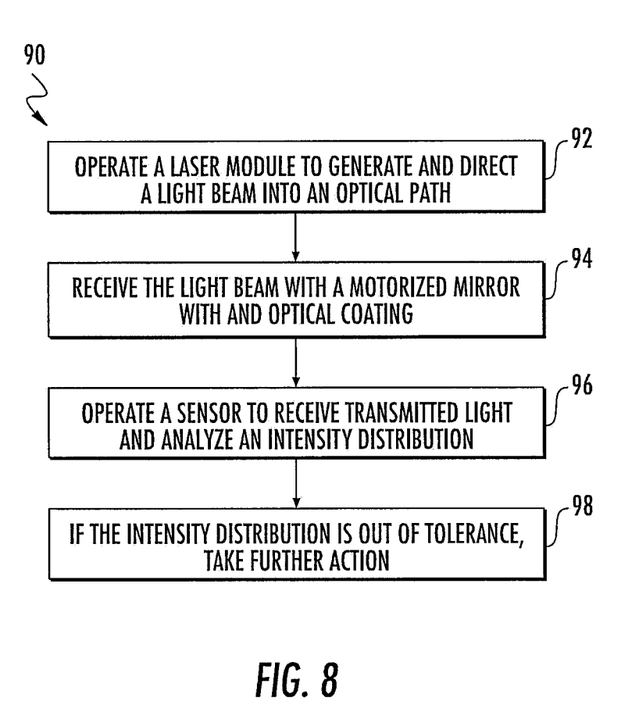
FIG. 8 is a flowchart depicting an embodiment of a method for analyzing a focus of a light beam.
Figure 9:
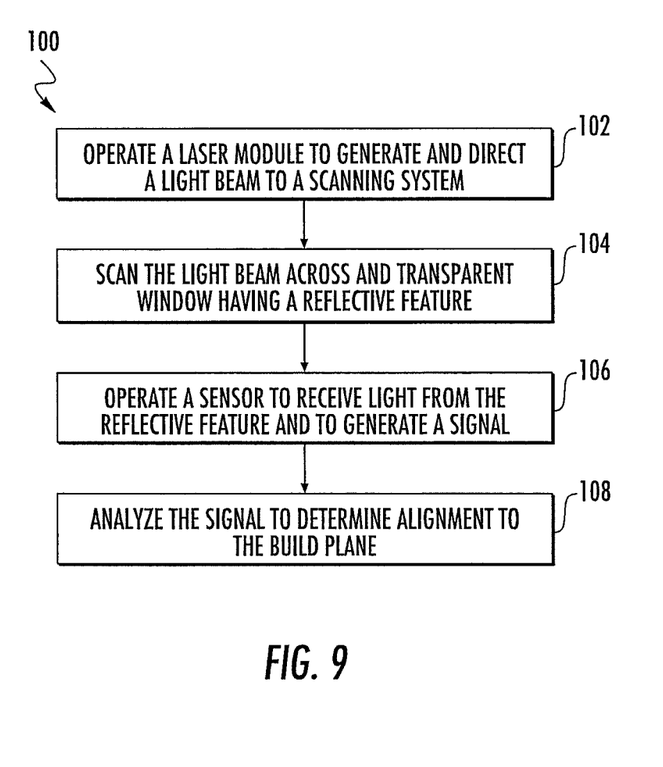
FIG. 9 is a flowchart depicting an embodiment of a method for aligning the scanning of a light beam to a build plane.

FIGS. 7, 8, and 9 are flowcharts describing methods for calibrating the three-dimensional printing system 2. The methods, described infra, are all performed by the controller 10. However, there may be manual processes associated with these methods.

FIG. 7 is a flowchart depicting an embodiment of a method 80 for aligning the light beam 26 to a main optical path 28. Method 80 should be performed whenever a new laser is installed into the laser module 22. Method 80 can also be performed continuously during operation of the three-dimensional printing system 2 in order to identify alignment drift so that corrective action can be taken.

According to 82, the laser module 22 is operated to generate and emit a light beam 26 along the main optical path 28. According to 84, the light beam 26 is received by a motorized mirror (e.g., X-mirror 42) having a front side optical coating 60 and a back side opaque feature 60. Less than 10% of the received radiative power is transmitted through the X-mirror 42. The X-sensor 48 receives at least some of the transmitted light along optical path 46.

According to 86, the X-sensor 48 is operated to receive transmitted light which includes a shadow from the opaque feature 62. Also, according to 86, the received light is analyzed to determine an alignment of the beam 26 with respect to the main optical path 28.

According to 88, a determination is made as to whether the alignment of beam 26 to optical path 28 is out of tolerance. If the alignment is out of tolerance, further action is also taken according to 88. The further action can include one or more of the following: (1) A message can be sent to the user interface 8 that alerts the user regarding the misalignment. (2) Instructions can be sent to user interface 8 that instruct the user to manually utilize aligner 24 to align the laser module 22. (3) Instructions can be sent to operate an automatic aligner 24 to automatically align the laser module 22.

FIG. 8 is a flowchart depicting an embodiment of a method 90 for characterizing the light beam 26 and taking further action as needed. According to step 92, the laser module 22 is operated to generate and emit a light beam 26 along the optical path 28. According to step 94, the light beam is received by a motorized mirror (e.g., Y-mirror 44) having a front side optical coating 66. Less than 10% of the received radiative power is transmitted through the Y-mirror. A sensor (e.g., Y-sensor 52) receives the transmitted radiation.

According to 96, the Y-sensor 52 receives the transmitted radiation and analyzes an intensity distribution. According to 98, a determination is made as to whether the light beam 26 is out of focus at the Y-sensor 52. If the light beam 26 is out of focus, then further action is take according to 98. The further action can include one or more of the following: (1) A message can be sent to the user interface 8 that alerts the user regarding the out of focus light beam 26. (2) Instructions can be sent to the user interface 8 for manually adjusting the focus. (3) A portion of the laser module 22 can be operated to auto-focus the light beam 26.

FIG. 9 is a flowchart depicting an embodiment of a method 100 for aligning a scanned light beam to a build plane using the apparatus depicted in FIG. 6. According to 102, the laser module 22 is operated to generate and emit a light beam 26 along the optical path 28 to the scanning system 30. According to 104, the scanning system 30 is operated to scan the light beam 26 across the transparent window 72. According to 106, the sensor 76 is operated to receive light from the reflective feature 74 and to generate a signal.

According to 108, the signal received from the sensor 76 is analyzed to align the light beam 26 to the reflective feature 74. In doing so, the light beam is aligned to the build plane 32.

In another embodiment, 108 includes determining a laser power from the signal. In some embodiments measurements can be taken at different laser power levels to provide a calibration at different power levels.

Figure 10:
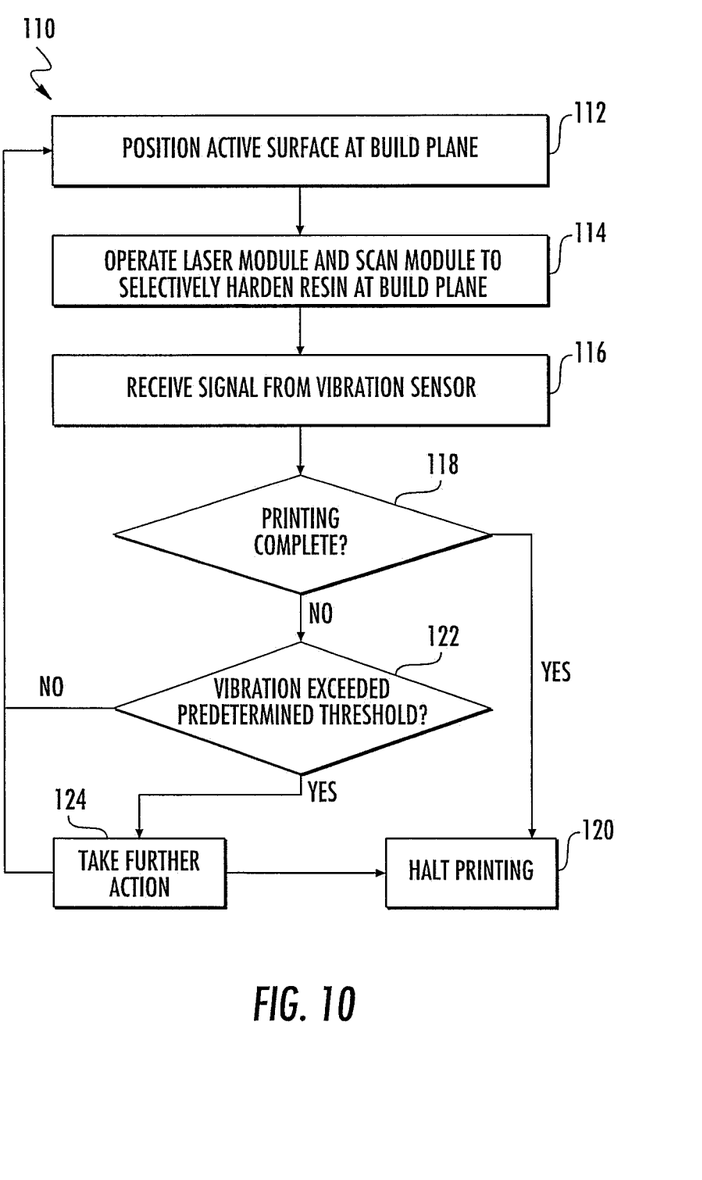
FIG. 10 is a flowchart depicting an embodiment of a method of operating the three-dimensional printing system 2.

FIG. 10 is a method 110 of manufacturing a three-dimensional article 14 using the three-dimensional printing system 2. According to 112, the controller positions active surface 17 at the build plane 32. As part of 112, a layer of resin 12 is dispensed or otherwise made to cover the active surface 17. According to 114, the laser module 22 and scan module 30 are operated to selectively polymerize the resin 12 at build plane 32.

According to 116, a signal is received from sensor 43. According to 118, a determination is made as to whether printing is complete. If so, printing is halted according to 120. If printing is not complete, then the signal is analyzed to see if the external vibration exceeded a predetermined threshold according to 122. If not, then the process loops back to 112 for the formation of another layer. If the threshold has been exceeded, then further action is taken according to 124.

The predetermined threshold for external vibration can be based on one or more factors. One factor is a peak magnitude or amplitude of the vibration. Another factor is a duration of the vibration. Yet another factor is an integration of vibrational energy over a certain time period.

Further action according to 124 can include one or more actions taken by the controller 10. A first action can be to halt the printing operation when the vibration is above a certain upper limit. Part of this first action can be to restart the printing operation when the vibration has fallen to a certain lower limit. A second action can be to store information concerning the vibration which can include one or more of a time stamp, a layer being formed, a position within the three-dimensional article, and a vibration factor such as one used for comparison with the threshold. A third action can be to send a warning to the user interface 8 that is indicative of a vibration being beyond a threshold or control limit.

In another implementation the further action vary depending upon more than one predetermined threshold being exceeded. A higher threshold can include halting the printing. A lower threshold can include storing information concerning the vibration.

In yet other embodiments, step 116 can include receipt of signals from other sensors. The further action 124 can include other adjustments such as adjustments in timing for alignment.

The exact sequence of method 110 can vary. For example, step 116 can occur concurrent with or between steps 112 and 114.

The specific embodiments and applications thereof described above are for illustrative purposes only and do not preclude modifications and variations encompassed by the scope of the following claims.

What is claimed:

1. A three-dimensional printing system for manufacturing a three-dimensional article comprising:
   a build platform for supporting the three-dimensional article, the build platform or the three-dimensional article defining an active surface for accreting a material layer;
   a light engine for addressing a build plane;
   a sensor mounted on the light engine that generates a signal based upon vibrations that originate from a source external to the light engine;
   a controller configured to:
      form layers of the three-dimensional article including:
         position the active surface at the build plane;
         operate the light engine to selectively cure portions of resin at the build plane; and
         repeat the positioning and operating to complete forming the three-dimensional article; and
      concurrent with forming the layers, receive a signal from the sensor;
      analyze the signal to compare received vibrations to a predetermined vibration threshold; and
      if the received vibrations exceed the predetermined threshold, take further action;
   further including a resin vessel containing resin, during formation of a layer the active surface is positioned proximate to a top surface of the resin, the light engine emitting light downwardly to the build plane.

2. The three-dimensional printing system of claim 1 wherein the light engine includes one or more of a laser module, an ultraviolet light source, a spatial light modulator, a light emitting diode array, and a scan module.

3. A three-dimensional printing system for manufacturing a three-dimensional article comprising:
   a build platform for supporting the three-dimensional article, the build platform or the three-dimensional article defining an active surface for accreting a material layer;
   a light engine for addressing a build plane;
   a sensor mounted on the light engine that generates a signal based upon vibrations that originate from a source external to the light engine;
   a controller configured to:
   form layers of the three-dimensional article including:
   position the active surface at the build plane;
   operate the light engine to selectively cure portions of resin at the build plane; and
   repeat the positioninq and operating to complete forminq the three-dimensional article; and
   concurrent with forming the layers, receive a signal from the sensor;
   analyze the signal to compare received vibrations to a predetermined vibration threshold; and
   if the received vibrations exceed the predetermined threshold, take further action, further comprising a resin vessel containing resin, the resin vessel including a transparent sheet that forms a lower surface of the resin vessel, the build plane and active surface are above and proximate to the transparent sheet, the light engine emitting light upwardly and through the transparent sheet and to the build plane.

4. The three-dimensional printing system of claim 1 wherein the light engine includes a base housing and a cantilevered support that extends from a proximal end at the base to a distal end, the sensor is mounted to the distal end of the cantilevered support to be more sensitive to the external sources of vibrations.

5. The three-dimensional printing system of claim 4 wherein the sensor is an accelerometer.

6. The three-dimensional printing system of claim 1 wherein the vibration threshold is based upon one or more of a peak vibration amplitude, a time duration of vibration, and an integration of vibration energy for a period of time.

7. The three-dimensional printing system of claim 1 wherein the further action includes halting forming layers.

8. The three-dimensional printing system of claim 7 wherein the controller is further configured to restart forming layers when the external vibration intensity has dropped to below a lower threshold.

9. The three-dimensional printing system of claim 1 wherein the further action includes storing information identifying a layer or position within a three-dimensional article at which the threshold was exceeded.

10. A three-dimensional printing system for solidifying a build material at a build plane in a layer-by-layer manner comprising:
    a laser module for emitting a light beam along a main optical path from the laser module to the build plane;
    a base housing;
    a cantilevered support that extends from a proximal end at the base housing to a distal end;
    a scan module mounted to the base housing at the proximal end of the cantilevered support, the scan module for receiving the light beam and scanning the light beam along two axes to address the build plane; and
    a distal sensor mounted at the distal end of the cantilevered support; and
    a controller configured to:
       operate the laser module to emit light along the main optical path;
       operate the scan module to scan the beam over the build plane;
       receive a signal from the distal sensor; and
       analyze the signal to determine whether vibrations originating external to the three-dimensional printing system have exceeded a predetermined vibration threshold.

11. The three-dimensional printing system of claim 10 further comprising a proximal sensor mounted at the proximal end for sensing vibrations from the mirror system.

12. The three-dimensional printing system of claim 11 wherein the proximal sensor is an accelerometer.

13. The three-dimensional printing system of claim 10 wherein the scan module defines a secondary optical path that passes a portion of the light beam along the cantilevered support.

14. The three-dimensional printing system of claim 13 further comprising an optical sensor at the distal end.

15. The three-dimensional printing system of claim 14 wherein the optical sensor is the distal sensor.

16. The three-dimensional printing system of claim 14 wherein the distal sensor is an accelerometer separate from the optical sensor.

17. The three-dimensional printing system of claim 16 wherein the controller analyzes signals from the optical sensor and the distal sensor to determine whether the external vibrations have exceeded the threshold.

18. The three-dimensional printing system of claim 10 wherein the distal sensor is an accelerometer.

* * * * *